(12) United States Patent
Guo

(10) Patent No.: US 10,857,702 B2
(45) Date of Patent: Dec. 8, 2020

(54) FORMING METHOD OF A PVB FILM FOR HUD

(71) Applicant: SAINT-GOBAIN GLASS FRANCE, Courbevoie (FR)

(72) Inventor: Xiaofeng Guo, Courbevoie (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/474,907

(22) PCT Filed: Dec. 28, 2017

(86) PCT No.: PCT/CN2017/119499
§ 371 (c)(1),
(2) Date: Jun. 28, 2019

(87) PCT Pub. No.: WO2018/121685
PCT Pub. Date: Jul. 5, 2018

(65) Prior Publication Data
US 2019/0329480 A1 Oct. 31, 2019

(30) Foreign Application Priority Data

Dec. 29, 2016 (CN) .......................... 2016 1 1245564
Dec. 29, 2016 (CN) ..................... 2016 2 1468104 U

(51) Int. Cl.
*B29C 37/00* (2006.01)
*B32B 17/10* (2006.01)
(Continued)

(52) U.S. Cl.
CPC .......... *B29C 37/0075* (2013.01); *B29C 33/68* (2013.01); *B29C 43/021* (2013.01);
(Continued)

(58) Field of Classification Search
CPC .......... B29C 37/0075; B32B 17/10568; B32B 17/10761; B32B 17/10935; B32B 17/10889
See application file for complete search history.

(56) References Cited

U.S. PATENT DOCUMENTS 3,868,286 A * 2/1975 Fariss ............... B32B 17/10761
156/163
3,912,440 A * 10/1975 Koss ..................... B29C 55/045
425/335
(Continued)

FOREIGN PATENT DOCUMENTS

| CN | 102164744 A | 8/2011 |
|----|-------------|--------|
| CN | 103182767 A | 7/2013 |

(Continued)

OTHER PUBLICATIONS

International Search Report as issued in International Patent Application No. PCT/CN2017/119499, dated Apr. 2, 2018.
(Continued)

*Primary Examiner* — Benjamin A Schiffman
(74) *Attorney, Agent, or Firm* — Pillsbury Winthrop Shaw Pittman LLP

(57) ABSTRACT

A PVB film for HUD, a forming mold and a forming method thereof are presented. The accuracy error of HUD imaging achieved by the PVB film for HUD is ±0.1 mrad. The forming mold includes an upper mold and a lower mold, the two of which can form an enclosed mold cavity when clamped together, wherein protective films are disposed on inner surfaces of the upper mold and the lower mold, respectively, for supporting PVB material and preventing the PVB material from bonding with the upper mold and the lower mold, and wherein shapes of the protective films match shapes of the upper mold and the lower mold.

11 Claims, 4 Drawing Sheets

(51) Int. Cl.
  *B29C 51/08* (2006.01)
  *B29C 51/14* (2006.01)
  *B29C 51/26* (2006.01)
  *B29C 51/30* (2006.01)
  *B29C 51/42* (2006.01)
  *B29C 33/68* (2006.01)
  *B29C 43/02* (2006.01)
  *B29C 43/36* (2006.01)
  *B29C 59/02* (2006.01)
  *B29K 29/00* (2006.01)
  *B29L 7/00* (2006.01)
  *B29L 31/00* (2006.01)

(52) U.S. Cl.
  CPC .......... *B29C 43/36* (2013.01); *B29C 51/082* (2013.01); *B29C 51/14* (2013.01); *B29C 51/266* (2013.01); *B29C 51/30* (2013.01); *B29C 51/421* (2013.01); *B29C 59/02* (2013.01); *B32B 17/10568* (2013.01); *B32B 17/10761* (2013.01); *B32B 17/10889* (2013.01); *B32B 17/10935* (2013.01); *B29C 2043/366* (2013.01); *B29K 2029/00* (2013.01); *B29K 2029/14* (2013.01); *B29L 2007/008* (2013.01); *B29L 2031/7738* (2013.01); *B32B 2605/006* (2013.01)

(56) References Cited

U.S. PATENT DOCUMENTS

| | | | | |
|---|---|---|---|---|
| 3,922,456 A * | 11/1975 | Baldridge | ......... | B32B 17/10761 428/203 |
| 3,960,627 A * | 6/1976 | Halberschmidt | ........................... | B32B 17/10018 156/104 |
| 3,982,984 A * | 9/1976 | Baldridge | ......... | B32B 17/10009 156/244.16 |
| 4,445,953 A * | 5/1984 | Hawk | ................... | B29C 51/14 156/102 |
| 4,504,341 A * | 3/1985 | Radzwill | ................ | B29C 51/28 156/102 |
| 4,973,364 A * | 11/1990 | Farrar | ................... | B29C 61/02 156/212 |
| 5,013,134 A | 5/1991 | Smith | | |
| 5,061,333 A * | 10/1991 | Ishikawa | ................ | B29C 51/16 156/213 |
| 5,087,502 A * | 2/1992 | Esposito | ............... | B26F 1/3813 428/156 |
| 5,130,174 A * | 7/1992 | Esposito | ........... | B32B 17/10339 428/156 |
| 5,639,538 A * | 6/1997 | Wong | ................ | B32B 17/10568 428/156 |
| 5,812,332 A * | 9/1998 | Freeman | ................... | B32B 3/02 359/894 |
| 5,945,199 A * | 8/1999 | Morin | ............... | B32B 17/10018 345/7 |
| 6,534,152 B2 * | 3/2003 | Freeman | ................... | B32B 3/02 428/172 |
| 7,452,608 B2 * | 11/2008 | Fukatani | ................. | B32B 17/10 428/436 |
| 7,521,110 B2 * | 4/2009 | Travis | ....................... | B32B 3/00 428/172 |
| 7,886,871 B2 * | 2/2011 | Miyai | ............... | B32B 17/10761 181/289 |
| 9,238,314 B2 * | 1/2016 | Tagami | ................... | B29C 43/18 |
| 10,226,803 B2 * | 3/2019 | Nakayama | ............. | B21B 27/00 |
| 10,300,681 B2 * | 5/2019 | Kawate | ..................... | B32B 3/28 |
| 10,363,696 B2 * | 7/2019 | Keller | ............... | B32B 17/10761 |
| 10,532,541 B2 * | 1/2020 | Nakayama | ........ | B32B 17/10825 |
| 2001/0044010 A1 * | 11/2001 | Freeman | ........... | B32B 17/10981 428/157 |
| 2002/0008926 A1 * | 1/2002 | Freeman | ................... | B32B 3/02 359/894 |
| 2004/0053006 A1 * | 3/2004 | Omizu | ................... | B65H 18/28 428/156 |
| 2004/0166288 A1 * | 8/2004 | Travis | .................... | G02B 27/01 428/156 |
| 2004/0191482 A1 * | 9/2004 | Nakajima | ............. | B29C 59/022 428/156 |
| 2004/0245659 A1 | 12/2004 | Glenn et al. | | |
| 2006/0008658 A1 * | 1/2006 | Fukatani | ........... | B32B 17/10697 428/437 |
| 2006/0210776 A1 * | 9/2006 | Lu | ......................... | G02B 27/01 428/192 |
| 2009/0294212 A1 * | 12/2009 | Miyai | ..................... | B32B 17/10 181/289 |
| 2010/0086744 A1 * | 4/2010 | Stenzel | ............. | B32B 17/10568 428/174 |
| 2011/0189426 A1 | 8/2011 | Durbin et al. | | |
| 2013/0161879 A1 * | 6/2013 | Tagami | ................... | B29C 33/68 264/571 |
| 2013/0273318 A1 * | 10/2013 | Yacovone | ........ | B32B 17/10449 428/141 |
| 2014/0000789 A1 * | 1/2014 | Yacovone | ........ | B32B 17/10761 156/99 |
| 2014/0242321 A1 * | 8/2014 | Schmid | ............. | B32B 17/10036 428/68 |
| 2017/0015082 A1 * | 1/2017 | Creytens | ........ | B32B 17/10568 |
| 2017/0144362 A1 * | 5/2017 | Nakayama | ........ | B32B 17/10761 |
| 2017/0266861 A1 * | 9/2017 | Keller | ................... | B29C 59/005 |
| 2018/0022058 A1 * | 1/2018 | Nakayama | ........ | B32B 17/10761 428/409 |
| 2018/0037008 A1 * | 2/2018 | Nakayama | ............. | B29C 59/04 |
| 2018/0050519 A1 * | 2/2018 | Nakayama | ................ | B24C 3/32 |
| 2018/0162105 A1 * | 6/2018 | Kawate | ............. | B32B 17/10761 |
| 2019/0329480 A1 * | 10/2019 | Guo | .......................... | C08J 5/18 |

FOREIGN PATENT DOCUMENTS

| | | | | |
|---|---|---|---|---|
| CN | 205185181 U | | 4/2016 | |
| CN | 206748878 U | | 12/2017 | |
| DE | 4227582 A1 * | | 2/1993 | ....... B32B 17/10036 |
| EP | 0103828 A2 * | | 3/1984 | ....... B32B 1/00 |
| EP | 0422557 A2 * | | 4/1991 | ....... B32B 37/1018 |
| JP | 2000044296 A * | | 2/2000 | ....... B32B 17/10568 |
| JP | 2004209950 A * | | 7/2004 | |
| WO | WO-9106031 A1 * | | 5/1991 | ....... B32B 17/10036 |
| WO | WO-9400787 A1 * | | 1/1994 | ....... B60J 1/008 |
| WO | WO-9946213 A1 * | | 9/1999 | ....... B32B 17/10761 |
| WO | WO-02103434 A1 * | | 12/2002 | ....... B32B 3/263 |
| WO | WO-2016143582 A1 * | | 9/2016 | ....... B60J 1/02 |
| WO | WO-2018121685 A1 * | | 7/2018 | ....... B29C 43/021 |

OTHER PUBLICATIONS

Office Action as issued in Chinese Patent Application No. 201611245564.7, dated Sep. 28, 2020.

* cited by examiner

FORMING METHOD OF A PVB FILM FOR HUD

CROSS REFERENCE TO RELATED APPLICATIONS

This application is the U.S. National Stage of PCT/CN2017/119499, filed Dec. 28, 2017, which in turn claims priority to Chinese Patent Application No. 201611245564.7 filed Dec. 29, 2016 and Chinese Patent Application No. 201621468104.6 filed Dec. 29, 2016, the entire contents of all applications are incorporated herein by reference in their entireties.

FIELD OF THE INVENTION

The present invention relates to the glass technical field, in particular to a PVB film for HUD and a forming mold of a PVB film for HUD, particularly a thermal-press-forming mold, and a forming method for manufacturing a PVB film for HUD that is based on a thermal-press-forming process and uses PVB material, such as common PVB films.

BACKGROUND

Head Up Display (HUD) allows drivers to read important information that they need without lowering their heads, thereby reducing the frequency at which drivers lower their heads to check the panel instruments, and avoiding distraction of their attention and loss of control of situation awareness. Hence, HUD is widely used in aircrafts and high-end vehicles as a driving-auxiliary device.

Currently, HUD generally employs a front windshield of an aircraft or a vehicle to display. The front windshield normally includes laminated glasses, which means two surfaces (i.e., inner and outer surfaces) are present, and thus two images at different positions but with similar brightness can be formed. This will result in a terrible ghost for the drivers. A common solution to this technical problem is to employ a PVB film having a wedged cross section with a wedged angle between laminated glasses, so as to adjust the position of the image on the outer surface and therefore eliminate the ghost.

However, commercially available PVB film with a wedged cross section is extremely expensive, sold at a price normally several times higher than that of the common PVB film with even thickness. Moreover, the commercially available PVB film for HUD with a wedged cross section is typically obtained by an extrusion molding process. Though an accuracy of the extrusion-molded PVB film can substantially meet the standard requirement, and can achieve an accuracy error of about ±0.15 mrad, it is understood that in order to meet the extremely high-level requirement on imaging clarity, the higher the imaging accuracy of HUD is, the better it will be.

In addition, as stated above, the commercially available PVB film with a wedged cross section is typically formed by an extrusion molding process. Due to shortcomings of the extrusion-molding, the obtained PVB film can at most have a wedged cross section in only one direction, and the cross section thereof in another direction would remain even and unchanged. For HUD in a large area, with a wedged cross section of the PVB film in only one direction, the clarity of HUD imaging may change when it is viewed from different perspectives. For instance, when the HUD is viewed from one perspective, the image may be clear, and when it is viewed from another perspective, the image may include ghost and become unclear, as a cross section of the PVB film in this perspective remains even and unchanged. Thereby, drivers cannot clearly see the information displayed on HUD and have to adjust their view perspectives, which may distract their attention. As a consequence, there are potential safety hazards.

SUMMARY OF THE INVENTION

Thereby, in order to overcome the abovementioned defects in the prior art, the present invention provides a PVB film for HUD, a forming mold and a forming method thereof.

According to a first aspect, a forming mold of a PVB film for HUD is provided, comprising an upper mold and a lower mold, the two of which can form an enclosed mold cavity when clamped together, wherein protective films are disposed on inner surfaces of the upper mold and the lower mold, respectively, for supporting PVB material and preventing the PVB material from bonding with the upper mold and the lower mold, and wherein shapes of the protective films match shapes of the upper mold and the lower mold.

In an embodiment, the thicknesses of the protective films are even.

In an embodiment, the thicknesses of the protection films are 0.1-1 mm.

In an embodiment, the thicknesses of the protective films are 0.1-0.25 mm.

In an embodiment, a cross section of the mold cavity in one direction is wedged.

In an embodiment, a cross section of the mold cavity in one direction is wedged, and a cross section of the mold cavity in another direction is curved. The one direction and another direction are preferably perpendicular to each other. Other suitable directions can also be applied.

In an embodiment, cross sections of the mold cavity in two directions are both curved. These two directions are preferably perpendicular to each other. Other suitable directions can also be applied.

In an embodiment, curved surfaces can compensate imaging accuracy based on a curved surface of a glass used by HUD imaging.

According to a second aspect, a forming method of a PVB film for HUD is provided, comprising the following steps: (a) sandwiching PVB material between two protective films, and then placing the PVB material into a pre-heated mold; or placing a first protective film of the two protective films into the pre-heated mold, and then placing the PVB material onto the first protective film, and finally placing a second protective film of the two protective films onto the PVB material; (b) clamping the mold; (c) pressurizing the mold and heating the mold to a desired temperature; (d) taking out a formed PVB film along with the two protective films; (e) cooling the formed PVB film; and (f) peeling the two protective films and obtaining the PVB film for HUD.

In an embodiment, the step (c) is conducted under a temperature of 120-200° C.

In an embodiment, the step (c) is conducted under a temperature of 160-170° C.

In an embodiment, the pressure in the step (c) is in a range of 10-100 MPa.

In an embodiment, the pressure in the step (c) is in a range of 20-30 MPa.

In an embodiment, the heating time in the step (c) is 20-180 seconds.

In an embodiment, the heating time in the step (c) is 60-120 seconds.

In an embodiment, the protective films are made of a heat resisting substrate and a non-stick coating.

In an embodiment, the protective films are made of a glass fiber substrate and a Teflon coating.

In an embodiment, the thicknesses of the protection films are 0.1-1 mm.

In an embodiment, the thicknesses of the protective films are 0.1-0.25 mm.

According to a third aspect, a PVB film for HUD is provided. An accuracy error of HUD imaging achievable by the PVB film is ±0.1 mrad.

In an embodiment, a cross section of the PVB film in one direction is wedged.

In an embodiment, a cross section of the PVB film in one direction is wedged, and a cross section of the PVB film in another direction is curved. The one direction and another direction are preferably perpendicular to each other. Other suitable directions can also be applied.

In an embodiment, cross sections of the PVB film in two directions are both curved. These two directions are preferably perpendicular to each other. Other suitable directions can also be applied.

In an embodiment, curved surfaces of the PVB film can compensate imaging accuracy based on a curved surface of a glass used by HUD imaging.

In an embodiment, the PVB film is made through the forming method according to the above second aspect, wherein the mold is the forming mold according to the above first aspect.

In the present invention, since a thermal-press-forming process is applied, commercially available common PVB films of low cost can be used as PVB material, so that the cost of manufacturing a PVB film for HUD can be reduced and the HUD imaging accuracy can be increased. Besides, the present invention can form a PVB film having a cross section of curved or other shapes in different directions, so that clear imaging can be obtained even in a HUD device with a large area. For instance, when a cross section of the PVB film in one direction is wedged and a cross section thereof in another direction is curved, users can obtain clear HUD images in a relatively large area. Accordingly, the films can be applied to large dimension HUD imaging. Further, when cross sections of the PVB film in two directions are both curved, curved surfaces of the PVB film can compensate imaging accuracy based on a curved surface of a glass used by the HUD imaging, so that a better quality of HUD imaging can be achieved.

DESCRIPTION OF DRAWINGS

The abovementioned and other features, characteristics and advantages of the present invention will become clearer through the following description combined with the drawings and specific embodiments, wherein.

EMBODIMENTS

Figure 1:
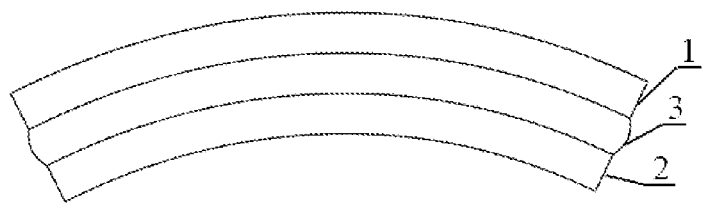
FIG. 1 is a schematic sectional view of a common windshield in the prior art.

Hereinafter provided is specific description of several embodiments of the present invention, with reference to the drawings. FIG. 1 illustrates a schematic sectional view of a common windshield in the prior art. As shown, the common windshield comprises an outer layer glass 1, an inner layer glass 2, and a common PVB film 3 with even thickness located therebetween. The common PVB film 3 has good viscosity, tenacity and elasticity. In case the windshield is subjected to a fierce external impact, the common PVB film 3 can absorb a large amount of energy, and the glass debris as generated can tightly adhere on the common PVB film without flying away. Therefore, potential damages can be reduced to the lowest level. However, the common PVB film 3 is not suitable for HUD imaging. The reason is that, a common windshield is normally formed of laminated glasses and has an inclined angle; if the thickness of the PVB film is even, the thickness of the entire windshield will also be even; as a result, when HUD imaging is performed, two separate reflected images will be formed. Thus, drivers can see two overlapped images (i.e., ghost), which is uncomfortable and may adversely affect driving safety.

Figure 2:
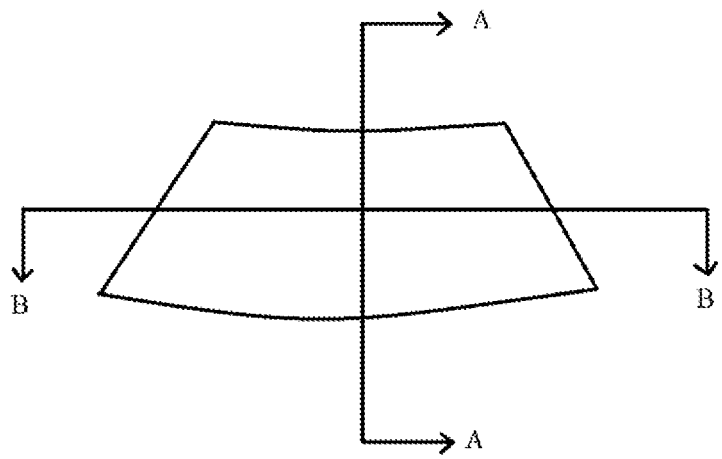
FIG. 2 is a schematic front view of a windshield.

FIG. 2 is a schematic front view of a windshield, and FIGS. 3(A), 3(B) are schematic sectional views of a windshield in the prior art taken along A-A and B-B directions as shown in FIG. 2, respectively, wherein the windshield comprises a common PVB film with even thickness. From FIGS. 3(A) and 3(B), it can be seen that cross sections of the common PVB film 3 in both A-A and B-B directions remain unchanged. As a result, if the common PVB film 3 is applied for HUD imaging, it would be impossible to adjust positions of the resulting HUD images formed on the outer layer glass 1 and inner layer glass 2, respectively, since the upper and lower surfaces of the film 3 are parallel to each other. Hence, two images with different positions are formed on the outer layer glass and the inner layer glass, respectively, leading to so called "ghost". Therefore, the common PVB film 3 shown in FIGS. 3(A) and (B) cannot be used for clear HUD imaging.

FIGS. 4(A) and (B) are schematic sectional views of another windshield in the prior art taken along A-A and B-B directions as shown in FIG. 2, respectively, wherein the windshield comprises a PVB film formed through an extrusion-molding process. From FIG. 4(A), it can be seen that a cross section of the PVB film 3 is wedged in A-A direction, which can contribute to clear HUD imaging. However, as shown in FIG. 4(B), a cross section of the PVB film 3 remains unchanged in B-B direction. Therefore, in case HUD imaging is required in a large area, the PVB film 3 formed by the extrusion-molding process can only form clear images in a relatively small region, and when seen by the users from different perspectives, since the cross section thereof in B-B direction is the same as that of a common PVB film (see FIG. 3(B)), clear HUD images cannot be created and ghost can still be seen, which is undesired. Also, there may be potential safety hazards.

Figure 5:
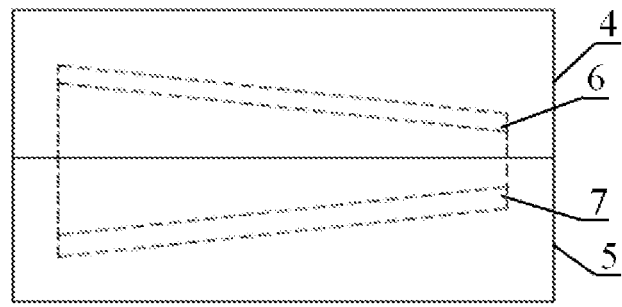
FIG. 5 is a schematic side view of a forming mold of PVB film for HUD according to the invention in a clamped position.

Now turns to FIG. 5, which shows a schematic side view of a forming mold of a PVB film for HUD according to the invention in a clamped position. The forming mold particularly refers to a mold for thermal-press-forming, and comprises an upper mold 4 and a lower mold 5. As shown, the upper mold 4 and lower mold 5 of the forming mold are in a closed state, viz. in a clamping position, thereby forming an enclosed mold cavity inside. The protective films 6 and 7 are placed onto the inner side surfaces of the upper mold 4 and lower mold 5, respectively.

Figure 6:
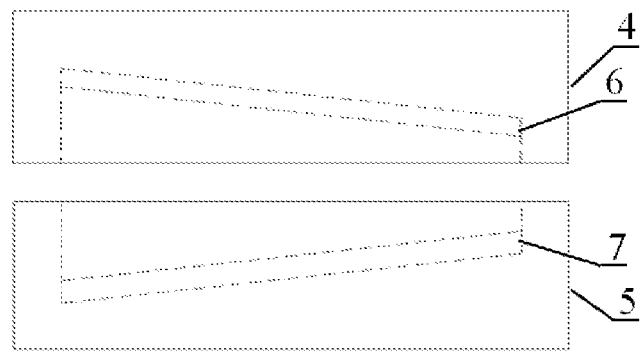
FIG. 6 is a schematic side view of a forming mold of PVB film for HUD according to the invention in an opened position.

FIG. 6 is a schematic side view of the above forming mold of a PVB film for HUD arranged in an opened position. As shown, an upper protective film 6 is disposed onto an inner surface of the upper mold 4 of the forming mold, and a lower protective film 7 is disposed onto an inner surface of the upper mold 5. The upper and lower protective films 6 and 7 may be fixed to the upper mold 4 and the lower mold 5 via bonding, and may also be fixed to the upper and lower molds 4 and 5 via any other suitable means. The upper and lower protective films 6 and 7 may have certain tenacity, and their shapes can adaptively match the shapes of the upper mold 4 and lower mold 5. Besides, the upper and lower protective films 6 and 7 have certain rigidity and can support PVB material located therebetween during a thermal-press-forming process, and can also prevent the PVB material from bonding with any of the upper mold 4 and the lower mold 5. The protective films may be made of a heat resisting substrate and a non-stick coating. In particular, the protective films may be formed by coating or spraying a Teflon coating on a glass fiber substrate. The upper and lower protective films 6 and 7 may be configured with even thicknesses, and a proper thickness error is certainly acceptable.

An extrusion-molding mold in the prior art generally forms the shape of a PVB film through a mold aperture, which is normally two-dimensional rather than three-dimensional. Hence, the cross section of the PVB film extruded by the extrusion-molding mold remains unchanged in a direction perpendicular to the mold aperture's cross section, and can only vary in one direction such as by having a wedged angle. Thus, the PVB film extruded by an extrusion-molding mold can only form clear images in a small region. In case the dimension of HUD is relatively large, since the cross sections of the PVB film in other directions are the same as those of a common PVB film, clear HUD images cannot be formed and ghost can still be seen by the users, which is undesired. Also, there may be potential safety hazards. Therefore, the PVB film formed by the extrusion-molding mold cannot be applied to the situation where HUD imaging in a large area is required.

Figure 7:
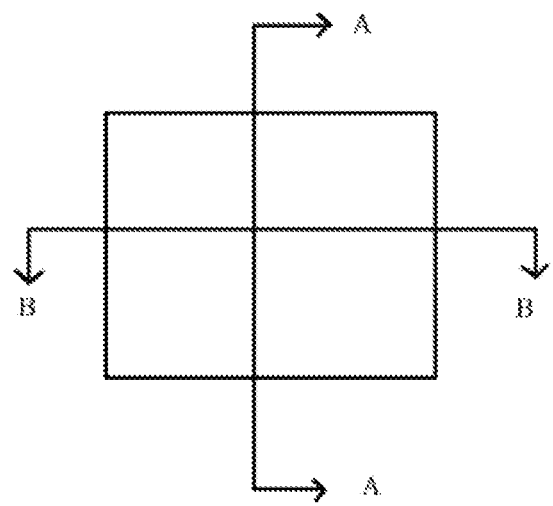
FIG. 7 is a schematic top view of a forming mold of PVB film for HUD.

In light of this, the inventor provides a special thermal-press-forming mold to overcome the abovementioned defects present in the prior art. Hereinafter provided is detailed description of a forming mold of a PVB film for HUD according to the present invention, with reference to FIGS. 7-9. FIG. 7 is a schematic top view of such a forming mold. As shown, when viewed from the top side, the forming mold is substantially rectangular in shape, with its length and width directions indicated at A-A and B-B, respectively. Optionally, the forming mold may have other shapes, such as a substantially trapezoid shape corresponding to a windshield.

FIGS. 8(A) and (B) illustrate schematic sectional views of a forming mold according to one embodiment of the invention taken along A-A and B-B directions as shown in FIG. 7, respectively. In this embodiment, as shown in FIG. 8(A), a mold cavity defined by the upper mold 4 and the lower mold 5 of the forming mold has a wedged cross section in A-A direction as shown in FIG. 7. Different from the mold aperture of a conventional extrusion-molding mold which is two-dimensional, the mold cavity of the thermal-press-forming mold of the present invention has a three-dimensional shape. The cross sections of such a mold cavity can vary in different directions. As shown in FIG. 8(B), the cross section of the mold cavity in B-B direction which is perpendicular to the A-A direction, is curved. Because of such configuration, the forming mold can form a PVB film for HUD imaging, wherein the cross section of the PVB film in A-A direction is wedged and the cross section of the film in B-B direction is curved, as will be described below. With such a PVB film, users can obtain clear HUD images in a relatively large area. Of course, such a forming mold can also produce a PVB film, such as that formed by an extrusion-molding mold with cross sections varying in only one direction (e.g., wedged in A-A direction), for example, when the cross section of the forming mold in B-B direction is linear.

FIGS. 9(A) and (B) illustrate schematic sectional views of a forming mold according to another embodiment of the invention taken along A-A and B-B directions as shown in FIG. 7, respectively. In this embodiment, as shown in FIG. 9(A), the mold cavity of the forming mold defined by the upper mold 4 and the lower mold 5 has a curved cross section in A-A direction as shown in FIG. 7. As shown in FIG. 9(B), the cross section of the mold cavity in B-B direction as shown in FIG. 7 is also curved. Due to such configuration, the forming mold can form a PVB film for HUD imaging, the cross sections of which are curved both in A-A and B-B directions, as will be described below. Curved surfaces of the PVB film can compensate imaging accuracy based on a curved surface of a glass used by HUD imaging, and compensate the shape of the curved surface of the glass, so that a better quality of HUD imaging is achievable.

Figure 8:
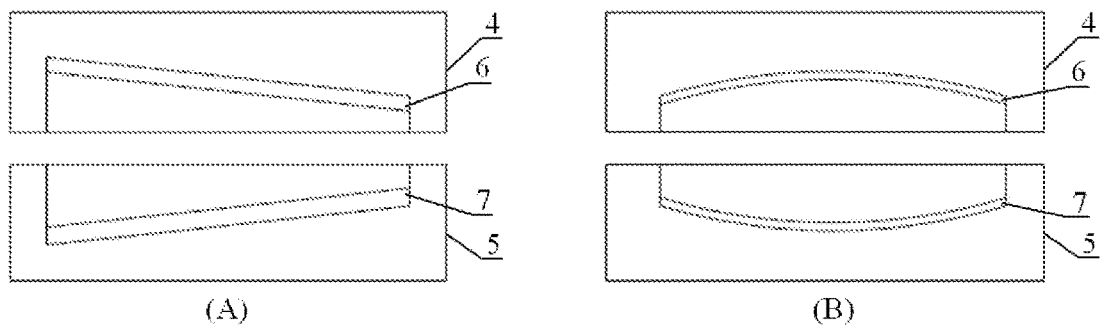
FIG. 8(A) is a schematic sectional view of a forming mold according to one embodiment of the invention taken along A-A direction shown in FIG. 7, with a cross section of the mold cavity being wedged; (B) is a schematic sectional view of the forming mold taken along B-B direction shown in FIG. 7, with a cross section of the mold cavity being curved.
Figure 9:
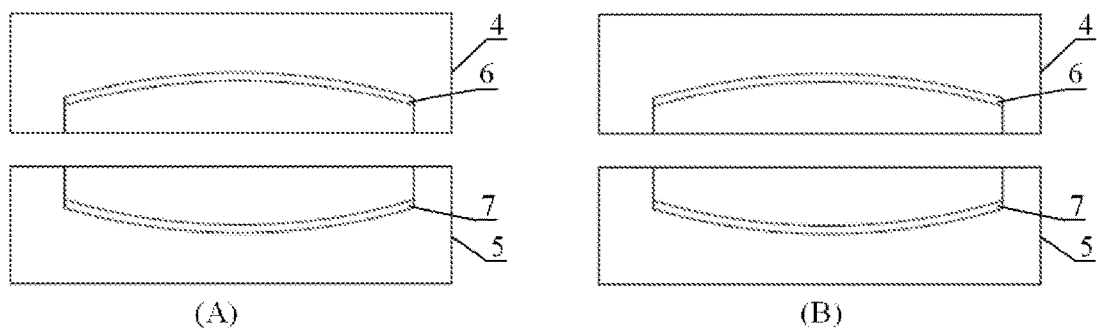
FIG. 9(A) is a schematic sectional view of a forming mold according to another embodiment of the invention taken along A-A direction shown in FIG. 7, with a cross section of the mold cavity being curved, (B) is a schematic sectional view of the forming mold taken along B-B direction shown in FIG. 7, with a cross section of the mold cavity being curved.
Figure 10:
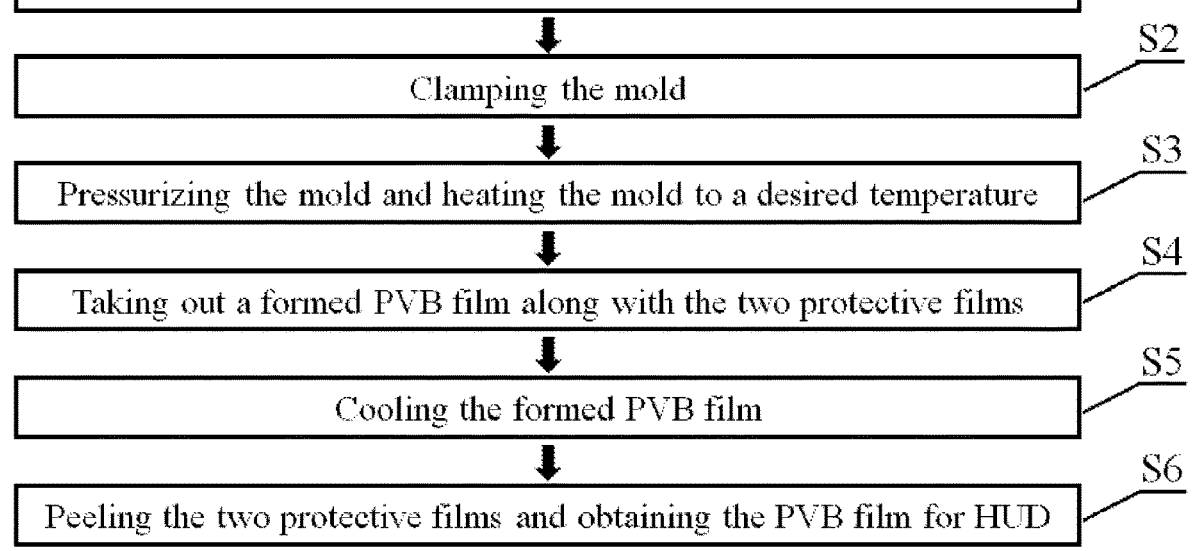
FIG. 10 is a schematic flow diagram representing a forming method for manufacturing a PVB film for HUD according to the invention that is based on a thermal-press-forming process.

Reference is now made to FIG. 10, which is a schematic flow diagram showing a forming method for manufacturing a PVB film for HUD according to the present invention, and details of the forming method will be provided. As shown, the invention provides a novel method for manufacturing a PVB film for HUD, which is based on a thermal-press-forming process and which comprises the following steps:

step S1, PVB material is sandwiched between two protective films, and is then placed into a pre-heated mold; or the first protective film of the two protective films is placed into the pre-heated mold, and then the PVB material is placed onto the first protective film, and finally the second protective film of the two protective films is placed onto the PVB material. Here, the two protective films can be made of a material more rigid than a soften PVB film. This material can be formed by coating or spraying a non-stick coating on a heat resisting substrate. Preferably, the material may comprise a glass fiber substrate and a Teflon coating. The thicknesses of two protective films can be even, such as 0.1-1 mm respectively. Preferably, the thicknesses can be 0.1-0.25 mm, respectively.

step S2, the molds, such as the upper and lower molds, are clamped together. The molds are thereby located at a clamped position as shown in FIG. 5. The PVB material will be located in the mold cavity within the mold, such as in a mold cavity defined by the upper mold 4 and the lower mold 5 as shown in FIG. 8 or FIG. 9.

step S3, the molds are pressurized and heated to a desired temperature. The pressure in this step may be in a range of 10-100 MPa, preferably 20-30 MPa. This step can be conducted at a temperature of 120-200° C., preferably a temperature of 160-170° C. The heating time as required for heating the mold to the desired temperature can be 20-180 seconds, preferably 60-120 seconds.

step S4, a formed PVB film is taken out, along with the two protective films.

step S5, the formed PVB film is cooled.

step S6, the two protective films are peeled, and the PVB film for HUD is obtained. The protective films comprise a heat resisting substrate and a non-stick coating, and thus are not easy to become deformed when heated and are easy to be peeled from the formed PVB film after cooling.

In the above forming process, the PVB material can be a common PVB film with even thickness. The common PVB film can melt and deform in step S1 or S3, thereby filling the mold cavity of the mold. The PVB film for HUD obtained by the above forming process can have a wedged cross section in one direction. That is, like the PVB film formed by the extrusion-molding process, the obtained PVB film has a wedged cross section in one direction. Preferably, the obtained PVB film has a wedged cross section in one direction and a curved cross section in another direction, wherein these two directions are intersecting, preferably perpendicular to each other. Optionally, the obtained PVB film has curved cross sections in both two directions, wherein these two directions are intersecting, preferably perpendicular to each other.

Hereinafter, with reference to FIGS. 11-12, comes detailed description of the specific configuration of a PVB film for HUD according to the present invention, as well as the difference between it and a common PVB film in the prior art or a PVB film formed by the conventional extrusion-molding process. Here, the obtained PVB film 8 is shown together with an outer layer glass 1 and an inner layer glass 2 on its two sides, for sake of clarity. These three members jointly form a windshield for an aircraft or vehicle. Similar to FIGS. 3 and 4, marks (A) and (B) shown in FIGS. 11-12 refer to schematic sectional views of the windshield including the PVB film 8 taken along A-A and B-B directions as shown in FIG. 2, respectively.

Figure 11:
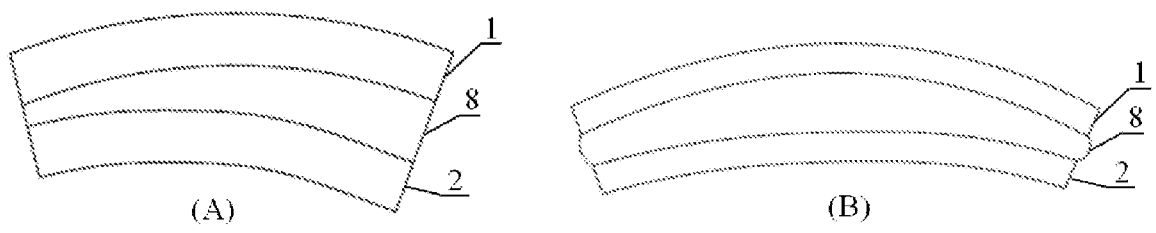
FIG. 11(A) is a schematic sectional view of a windshield including a PVB film according to one embodiment of the invention taken along A-A direction shown in FIG. 2, with a cross section of the PVB film being wedged; (B) is a schematic sectional view of the windshield taken along B-B direction shown in FIG. 2, with a cross section of the PVB film being curved.

A PVB film 8 shown in FIG. 11 is formed by the above forming method using the forming mold shown in FIG. 8. As shown in FIG. 11(A), the cross section of the obtained PVB film 8 in A-A direction shown in FIG. 2 is wedged, which is different from that of the common PVB film with even thickness in the prior art (see FIG. 3), but the same as that of the commercially available extrusion-molded PVB film (see FIG. 4). However, unlike the commercially available extrusion-molded PVB film, the cross section of the PVB film 8 according to the present invention in B-B direction shown in FIG. 2 is curved, as shown in FIG. 11(B). Because of such configuration, users can obtain clear HUD images in a relatively large area. Hence, this PVB film 8 can be applied to large dimension HUD imaging.

Figure 3:
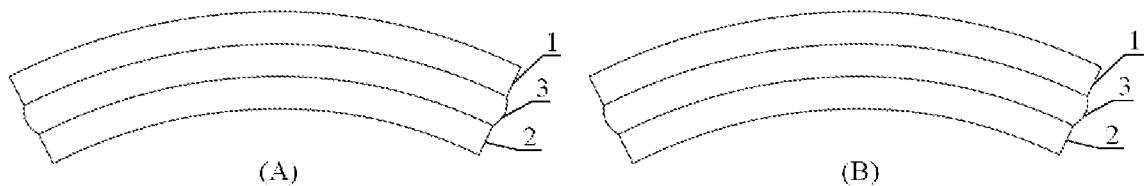
FIG. 3(A) is a schematic sectional view of a windshield in the prior art taken along A-A direction shown in FIG. 2; (B) is a schematic sectional view of the windshield taken along B-B direction shown in FIG. 2; wherein the windshield comprises a common PVB film with even thickness.
Figure 4:
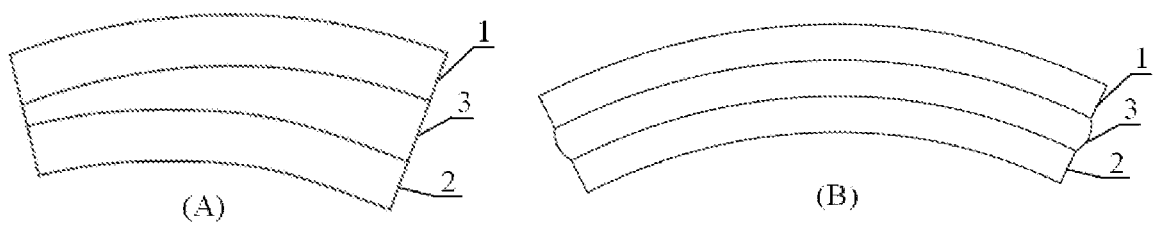
FIG. 4(A) is a schematic sectional view of another windshield in the prior art taken along A-A direction shown in FIG. 2; (B) is a schematic sectional view of the windshield taken along B-B direction shown in FIG. 2; wherein the windshield comprises a PVB film formed by the extrusion-molding process.
Figure 12:
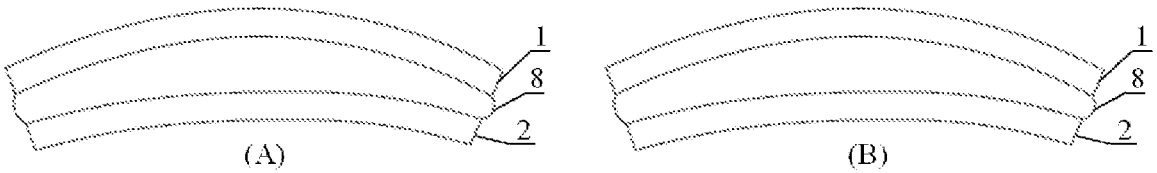
FIG. 12(A) is a schematic sectional view of a windshield including a PVB film according to another embodiment of the invention taken along A-A direction shown in FIG. 2, with a cross section of the PVB film being curved; (B) is a schematic sectional view of the windshield taken along B-B direction shown in FIG. 2, with a cross section of the PVB film being curved.

A PVB film 8 shown in FIG. 12 is formed by the above forming method using the forming mold shown in FIG. 9. As shown in FIG. 12(A), the cross section of the obtained PVB film 8 in A-A direction is curved. As shown in FIG. 12(B), the cross section of the PVB film 8 in B-B direction is also curved. The cross section of this PVB film 8 in either A-A direction or B-B direction is different from those of the PVB films in the prior art (FIGS. 3 and 4). Due to such configuration, curved surfaces of the PVB film can further compensate imaging accuracy based on a curved surface of a glass used by HUD imaging, and also compensate the shape of the curved surface of the glass, so that a better quality of HUD imaging can be achieved. Thus, PVB film 8 shown in FIG. 12 is particularly useful for large area HUD imaging.

Of course, since the method of the present invention for manufacturing a PVB film for HUD is based on a thermal-press-forming process, shapes of the mold cavity of the thermal-press-forming mold can be modified according to various HUD imaging requirements, so that the PVB films with any required cross sections in different directions can be made, and clear HUD imaging can be achieved at the same time.

The PVB film for HUD according to the invention that is manufactured by the above forming mold and forming method can make an accuracy error of HUD imaging to be as low as ±0.1 mrad. On the contrary, the accuracy error of HUD imaging achieved by commercially available extrusion-molded PVB film is around ±0.15 mrad. Hence, the HUD imaging achieved by the present invention can have much higher accuracy as compared with the prior art.

Although the present invention has been described as above, it is not limited thereto. Any person skilled in the art can make various amendments and alteration to it, without departing from the spirit and scope of the present invention. Hence, the protection scope of the invention shall be determined based on the scope defined by the appended claims.

The invention claimed is:

1. A forming method of a PVB film for HUD, comprising the following steps:
   (a) sandwiching PVB material between two protective films, and then placing the PVB material into a pre-heated mold; or placing a first protective film of the two protective films into the pre-heated mold, and then placing the PVB material onto the first protective film, and finally placing a second protective film of the two protective films onto the PVB material;

(b) clamping the mold;

(c) pressurizing the mold and heating the mold to a desired temperature;

(d) taking out a formed PVB film along with the two protective films;

(e) cooling the formed PVB film; and (f) peeling the two protective films and obtaining the PVB film for HUD.

2. Forming method according to claim 1, wherein the step (c) is conducted under a temperature of 120-200° C.

3. Forming method according to claim 2, wherein the step (c) is conducted under a temperature of 160-170° C.

4. Forming method according to claim 1, wherein a pressure in the step (c) is in a range of 10-100 MPa.

5. Forming method according to claim 4, wherein the pressure in the step (c) is in a range of 20-30 MPa.

6. Forming method according to claim 1, the wherein a heating time in the step (c) is 20-180 seconds.

7. Forming method according to claim 6, wherein the heating time in the step (c) is 60-120 seconds.

8. Forming method according to claim 1, wherein the protective films are made of a heat resisting substrate and a non-stick coating.

9. Forming method according to claim 8, wherein the protective films are made of a glass fiber substrate and a Teflon coating.

10. Forming method according to claim 1, wherein the thicknesses of the protection films are 0.1-1 mm.

11. Forming method according to claim 10, wherein the thicknesses of the protective films are 0.1-0.25 mm.

* * * * *